Sept. 19, 1961 K. S. KNOL ET AL 3,001,146

TRANSISTOR AMPLIFIER

Filed Oct. 29, 1956

INVENTORS
KORNELIS SWIER KNOL
HENDRIK VAN DE WEG

BY Fred M. Vogel
AGENT 3,001,146

TRANSISTOR AMPLIFIER

Kornelis Swier Knol and Hendrik van de Weg, Eindhoven, Netherlands, assignors, by mesne assignments, to North American Philips Company, Inc., New York, N.Y., a corporation of Delaware Filed Oct. 29, 1956, Ser. No. 618,888
Claims priority, application Netherlands Nov. 14, 1955
4 Claims. (Cl. 330—31)

This invention relates to transistor amplifiers for amplifying electrical signals from a signal source and has more particularly for its object to provide a transistor amplifier having a high signal-to-noise ratio.

It has been found from measurements and theoretical considerations, on which the invention is based, that the noise produced by the transistor not only varies with the frequency, as is known, but also with the value of the impedance connected to the transistor input electrodes. It is found that the noise decreases as this impedance approaches a purer resistance character, and passes through a minimum at a given optimum value of the impedance.

The present invention has the feature, in accordance with the above findings, that between the signal source and the input electrodes of the transistor there is connected a network which, in combination with the internal resistance of the signal source, viewed from these input electrodes, practically constitutes the optimum frequency-dependent impedance required for minimum noise within the signal frequency range. In this manner it is obtained that the transistor input impedance varies automatically with respect to the various frequencies so as to invariably secure the optimum signal-to-noise ratio.

In order that the invention may be readily carried into effect it will now be described in detail with reference to the accompanying drawing, in which—

Figure 1:
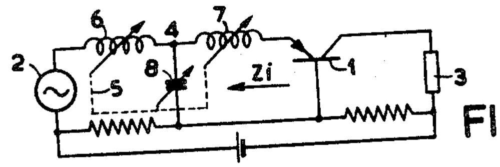
FIG. 1 is a schematic circuit diagram of one embodiment of the invention.

FIG. 1 shows a transistor 1 by means of which oscillations from a signal source 2 are amplified and supplied to an output impedance 3. The transistor 1 is operated in common base-arrangement (that is to say that the base is common to the input circuit and output circuit of the transistor) in which case signal frequencies in the proximity of the cut-off frequency $fc$ of the collector-emitter current amplification factor $\alpha_{ce}$ can still be amplified passably. However, the following considerations also apply to operation in grounded emitter-arrangement.

Figure 2:
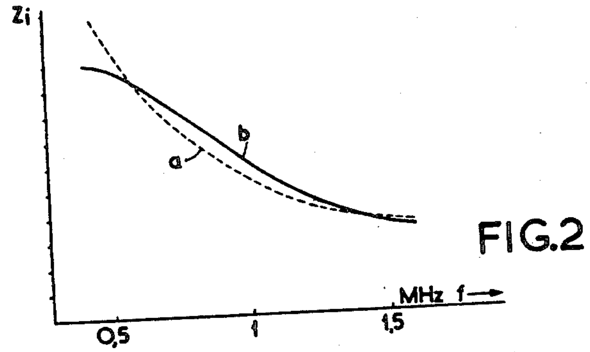
FIG. 2 represents the impedance $Z_1$ of FIG. 1 as a function of the frequency $f$.

It is found that the impedance $Z_1$, which the transistor input electrodes view in the direction of the signal source 2, acts upon the signal-to-noise ratio. In order to minimize the noise this impedance $Z_1$ should be an impedance with a small phase angle in the range of frequencies to be amplified having a frequency-dependency substantially as represented by the curve $a$ in FIG. 2.

As can be seen from this figure, the impedance $Z_1$ varies substantially inversely proportional to frequency.

In accordance with the invention, the transistor-input circuit comprises a frequency-dependent network 4 which, in combination with the internal resistance of the signal source 2, viewed from the input electrodes substantially has the character of an impedance with a small phase angle and approximately corresponds to said curve $a$ within the signal frequency range. More particularly, the impedance $Z_1$ in the transistor-input circuit may differ at most 25% from the curve $a$ with respect to the signal frequency range and may have a maximum phase angle of approximately 30°.

In the proximity of said cut-off frequency $fc$, the curve $a$ varies substantially inversely proportionally to the frequency $f$. This variation occurs substantially from a frequency as low as $$\frac{fc}{\sqrt{\alpha_{cb}}}$$

onwards where $\alpha_{cb}$ represents the collector-base current amplification factor. As usual, the frequency at which $\alpha_{ce}$ drops to $\frac{1}{2}\sqrt{2}$ of its initial value is the cut-off frequency $fc$.

Figure 3:
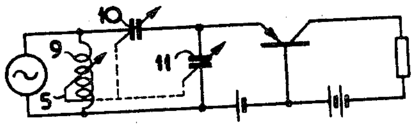
FIG. 3 is a modification of the embodiment of FIG. 1.

One mode of fulfilling the said desiderata and suitable for a narrow variable band of signal frequencies is exemplified in FIGS. 1 and 3 respectively, and consists in making up the signal-frequencies passing network 4 of three reactances operated by means of a common setting mechanism 5, these reactances consisting of two inductances 6, 7 and a capacitor 8 in FIG. 1, and of an inductance 9 with two capacitors 10, 11 tuned to the signal frequency in FIG. 3. The control mechanism 5 shown in FIGS. 1 and 3 respectively should simultaneously vary the inductances 6, 7 and 9 respectively inversely proportionally to the 3/2 power and the capacitors 8 and 10, 11 respectively inversely proportionally to the root of the signal frequency, so that all the reactances vary inversely proportionally to the root of the signal frequency. By making the variable inductances more sharply frequency dependent, the inductance 7 may alternatively be omitted or the inductance 9 may be made invariable.

Figure 4:
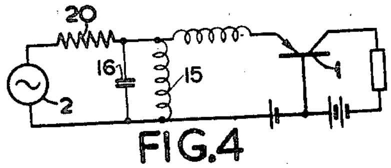
FIG. 4 is a schematic circuit diagram of a second embodiment of the invention.
Figure 5:
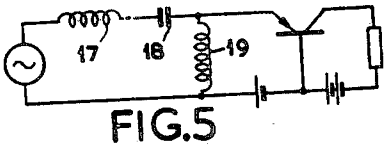
FIG. 5 is a modification of the embodiment of FIG. 4.

In order to amplify a wide band of signal frequencies use may be made of the networks shown in FIGS. 4 and 5, which comprise an inductance 14 in the series arm and a parallel resonance circuit 15, 16 in the shunt arm, and a series resonance circuit 17, 18 in the series arm and an inductance 19 in the shunt arm respectively. These networks have a transmittance curve corresponding to the signal frequency band and, viewed from the transistor-input electrodes, an impedance with a series- and a parallel resonance, the series resonance considerably exceeding the parallel resonance. Of course, further extension of the network concerned, allows of better matching to the curve $a$ shown in FIG. 2, for example by tandem-connection of the networks 14, 15, 16 and 17, 18, 19.

Figure 6:
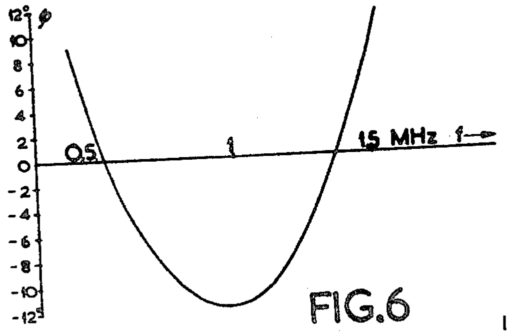
FIG. 6 shows the phase $\phi$ as a function of the frequency $f$ of a network as shown in FIG. 4.

A practical form, in which the transistor 1 shown in FIG. 4 had an input resistance of 25 ohms, comprised a signal source 2 having an internal resistance 20 of 200 ohms. The transistor cut-off frequency $fc$ was 2 mcs., and the signal band to be amplified was 0.5 to 1.5 mcs., the inductance 14 amounting to 12 $\mu$h., the inductance 15 to 170 $\mu$h. and the capacitor 16 to 800 pf. In this case, the impedance characteristic corresponds to the curve $b$ shown in FIG. 2 and the phase angle to that shown in FIG. 6.

The above data, exemplifying a practical form of the invention, are given to enable ready practice of the invention, and are not meant in any way to limit the scope thereof, the exact scope of the invention being defined in the appended claims.

What is claimed is:

1. A transistor amplifier having a high signal-to-noise ratio for amplifying electrical signals comprising a transistor having an emitter electrode, a base electrode and a collector electrode, a source of electrical signals to be amplified, one terminal of said source being connected to said base electrode, the other terminal of said source being connected through a frequency dependent impedance network to said emitter electrode, said network comprising a plurality of inductive elements connected in series between said emitter electrode and said other terminal of said source and a capacitive element connected between said base electrode and the junction of two or said inductive elements, said signal-to-noise ratio being dependent on the value of the impedance connected to said base and emitter electrodes, said network having a substantially small phase angle and an impedance which varies substantially inversely to frequency in the frequency range of the electrical signals, and a load circuit connected between said base and collector electrodes.

2. A transistor amplifier having a high signal-to-noise ratio for amplifying electrical signals comprising a transistor having an emitter electrode, a base electrode and a collector electrode, a source of electrical signals to be amplified, one terminal of said source being connected to said base electrode, the other terminal of said source being connected through a frequency dependent impedance network to said emitter electrode, said network comprising a first capacitive element connected between said emitter electrode and said other terminal of said source, a second capacitive element connected between said base and emitter electrodes and an inductive element connected across said capacitive elements, said signal-to-noise ratio being dependent on the value of the impedance connected to said base and emitter electrodes, said network having a substantially small phase angle and an impedance which varies substantially inversely to frequency in the frequency range of the electrical signals, and a load circuit connected between said base and collector electrodes.

3. A transistor amplifier having a high signal-to-noise ratio for amplifying electrical signals comprising a transistor having an emitter electrode, a base electrode and a collector electrode, a source of electrical signals to be amplified, one terminal of said source being connected to said base electrode, the other terminal of said source being connected through a frequency dependent impedance network to said emitter electrode, said network comprising a first inductive element connected between said emitter electrode and said other terminal of said source and a parallel resonant circuit comprising a capacitor and a second inductive element connected in parallel across said first inductive element and said base electrode, said signal-to-noise ratio being dependent on the value of the impedance connected to said base and emitter electrodes, said network having a substantially small phase angle and an impedance which varies substantially inversely to frequency in the frequency range of the electrical signals, and a load circuit connected between said base and collector electrodes.

4. A transistor amplifier having a high signal-to-noise ratio for amplifying electrical signals comprising a transistor having an emitter electrode, a base electrode and a collector electrode, a source of electrical signals to be amplified, one terminal of said source being connected to said base electrode, the other terminal of said source being connected through a frequency dependent impedance network to said emitter electrode, said network comprising a first inductive element connected between said emitter electrode and said base electrode, and a capacitor and a second inductive element connected between said emitter electrode and said other terminal of said source, said signal-to-noise ratio being dependent on the value of the impedance connected to said base and emitter electrodes, said network having a substantially small phase angle and an impedance which varies substantially inversely to frequency in the frequency range of the electrical signals, and a load circuit connected between said base and collector electrodes.

References Cited in the file of this patent

UNITED STATES PATENTS

| | | |
|---|---|---|
| 2,615,983 | Bussard | Oct. 28, 1952 |
| 2,691,074 | Eberhard | Oct. 5, 1954 |
| 2,704,792 | Eberhard | Mar. 22, 1955 |
| 2,720,627 | Llewellyn | Oct. 11, 1955 |
| 2,729,708 | Goodrich | Jan. 3, 1956 |
| 2,831,968 | Stanley | Apr. 22, 1958 |

OTHER REFERENCES

Lo et al.: Transistor Electronics, page 163, published by Prentice-Hall Inc., September 1955.

Shea: Principals of Transistor Circuits, published by John Wiley and Sons, Inc., copyright September 1953.